United States Patent [19]

Smith

[11] Patent Number: 4,623,504
[45] Date of Patent: Nov. 18, 1986

[54] METHOD AND APPARATUS FOR MAKING POST-TENSIONING TENDONS FOR CONCRETE

[76] Inventor: Larry F. Smith, 2600 Stone Creek, Plano, Tex. 75050

[21] Appl. No.: 663,584

[22] Filed: Oct. 22, 1984

[51] Int. Cl.⁴ .............................................. B29C 47/02
[52] U.S. Cl. ................... 264/566; 156/244.21; 264/568; 264/173; 264/174; 425/71; 425/112; 425/113
[58] Field of Search ............... 264/566, 568, 173, 242, 264/174, 172; 425/113, 112, 71; 156/244.21

[56] References Cited

U.S. PATENT DOCUMENTS

| | | | |
|---|---|---|---|
| 3,196,060 | 7/1965 | Priaroggia | 264/101 |
| 3,227,786 | 1/1966 | Cohen | 264/174 |
| 3,579,623 | 5/1971 | Thomson et al. | 264/174 |
| 3,646,748 | 3/1972 | Lang | 427/409 |
| 3,737,490 | 6/1973 | Nicholson | 425/113 |
| 3,876,464 | 4/1975 | McNerney | 264/174 |
| 3,892,912 | 7/1975 | Hauck | 264/174 |
| 3,899,384 | 8/1975 | Kelly | 425/113 |
| 4,085,183 | 4/1978 | Roe | 264/174 |
| 4,290,841 | 9/1981 | Fukuhara | 425/113 |
| 4,435,348 | 3/1984 | Standley | 425/113 |

FOREIGN PATENT DOCUMENTS 7014940  4/1971  Netherlands .................... 425/114

Primary Examiner—Jeffery Thurlow
Attorney, Agent, or Firm—Kanz, Scherback & Timmons

[57] ABSTRACT

A method of making a tendon suitable for use in the post-tensioning of concrete as well as for other applications is disclosed. The method comprises the steps of coating a wire or a multiple-wire strand with a thin coat of a corrosion inhibitor. In the preferred embodiment, the thin coat may be more easily applied by coating the wire or multiple-wire strand with a thick coating of corrosion inhibitor and then removing the surplus amount of the corrosion inhibitor from the outer periphery of the strand, including the interstices, to leave the desired thin coat. A seamless plastic jacket is then formed around the wire or the multiple-wire strand while simultaneously creating a differential pressure across the wall of the seamless plastic jacket to provide a loosely fitting seamless plastic jacket.

12 Claims, 4 Drawing Figures

METHOD AND APPARATUS FOR MAKING POST-TENSIONING TENDONS FOR CONCRETE

BACKGROUND OF THE INVENTION

1. Field of the Invention

The present invention relates in general to pre-stressed concrete. More particularly, it relates to methods of making tendons which are used primarily in post-tensioning of pre-stressed concrete.

2. Description of the Prior Art

In the process of pre-stressing concrete is by the technique of post-tensioning, it is important that the tendon be free to move within the hardened concrete so that the tensile load on the tendon is evenly distributed along the length of the tendon.

Various methods have been used in attempts to assure that the tendons used for post-tensioning concrete are capable of free movement within the hardened concrete. These methods include the laying of a number of parallel strands of wire in a metal duct or plastic tube and then stretching the strands after the concrete is hardened. The duct or tube is usually filled with grease after the strands are stretched. Also, a number of parallel strands of wire have been covered with grease and then covered with spirally wound paper. In some cases the spirally wound paper is replaced by spirally wound plastic. Another alternative to the paper wrapped tendon is the cigarette wrap or lap seam tendon. Tendons have also bee produced by stuffing or pushing a greased seven wire strand into and through a previously extruded plastic tube.

U.S. Pat. No. 3,646,748 discloses a post-tensioning tendon which comprises a multiple-wire strand encased in a corrosion inhibitor in an amount sufficient to provide a circular encasement around the strand of a diameter at least two mils greater than the diameter of the strand and having a seamless plastic jacket tightly covering the encased strand. A process for making such tendons is also disclosed.

All such prior tendons, however, suffer from one or more practical deficiencies such as high manufacturing cost, low reliability and a low level of assurance of trouble-free service. The present invention provides post-tensioning tendons which are without the deficiencies of the prior art.

SUMMARY OF THE INVENTION

The present invention provides a method of making a tendon suitable for use in the post-tensioning of concrete as well as for other applications. The method comprises the steps of coating a wire or a multiple-wire strand with a thin coat of a corrosion inhibitor. In the preferred embodiment, the thin coat may be more easily applied by coating the wire or multiple-wire strand with a thick coating of corrosion inhibitor and then removing the surplus amount of the corrosion inhibitor from the outer periphery of the strand, including the interstices, to leave the desired thin coat. A seamless plastic jacket is then formed around the wire or multiple-wire strand while simultaneously creating a differential pressure across the seamless plastic jacket such that the pressure in the volume defined by the seamless plastic jacket is greater than the pressure outside the seamless plastic jacket.

Among the advantages offered by the present invention is a resulting tendon which is low in cost of manufacture but still provides a tendon which is high in reliability and assurance of trouble-free service. The resulting tendon tends to not bleed grease through the ends of the tendon or through any pin holes which might occur in the seamless plastic jacket.

Examples of the more important features and advantages of this invention have thus been summarized rather broadly in order that the detailed description thereof that follows may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements, in which:

DESCRIPTION OF THE PREFERRED EMBODIMENT

Figure 2:
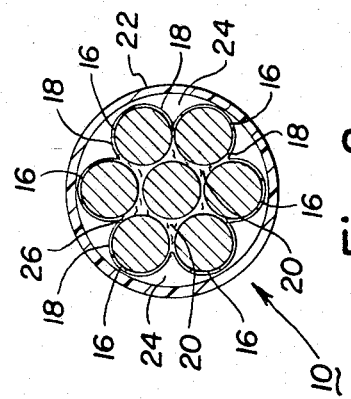
FIG. 2 is an enlarged simplified cross-sectional view taken on line 2—2 of FIG. 1.
Figure 1:
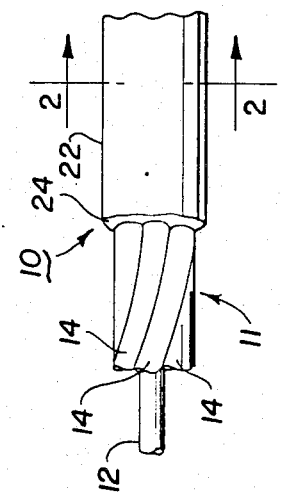
FIG. 1 is a simplified side view showing the components of a tendon made by the present inventive method.

Referring now to the drawing, and in particular to FIGS. 1 and 2, the tendon made by the present inventive method is generally referred to by reference numeral 10. Tendon 10 comprises a multi-wire strand 11 composed of center wire 12 surrounded by six helically wrapped wires 14. The exposed or outer surface 16 of each of the six helically wrapped wires 14 is coated with a thin coat of thixotropic corrosion inhibitor 18. Of course, if and where the outer surfaces of adjacent wrapped wires 14 are in contact with each other, very little if any thixotropic corrosion inhibitor 18 may be present.

In the pockets 20 formed by the surfaces of adjacent wrapped wires 14 and the center wire 12 the amount of thixotropic corrosion inhibitor 18 may be greater than a thin coat in thickness since the thixotropic corrosion inhibitor 18 fills the volume so formed to describe pockets 20. The interstices 26 are not filled with thixotropic corrosion inhibitor since only the thin coats of thixotropic corrosion inhibitor 18 on wrapped wires 14 protrude into interstices 26. Thus the mess caused by excess amounts of grease in prior art tendons (which leaks out the ends of the tendons and through any breaks or pinholes in the jacket) is substantially eliminated by the present invention.

The thixotropic corrosion inhibitor 18 should have grease-like properties relative to its ability to be applied to the wrapped wires 14 and to stay put and adhere to the wires of the multi-wire strand 11. The thixotropic corrosion inhibitor not only acts as a corrosion inhibitor for the wires of the multi-wire strand 11 but also acts as a lubricant between the individual wires of the multi-wire strand 11 and between the multi-wire strand 11 and a loosely fitting seamless plastic jacket 22.

The coated wires 14 are surrounded by a loosely fitting seamless plastic jacket 22 which provides an air space 24 between the plastic jacket 22 and the outer surfaces 16 of the coated wrapped wires 14. The inside diameter of the seamless plastic jacket 22 is greater than the diameter of the multi-wire strand 11 such as to form a loosely fitting jacket. The diameter of the multi-wire strand 11 is the diameter of the circle that touches the outside surface of the wrapped wires 14.

The seamless plastic jacket 22 should be sufficiently thick and tough such as not to be easily punctured during shipping and handling and also during the positioning of the tendon and the pouring of the concrete therearound. The plastic used in making the jacket can be any thermoplastic polymer which has low permeability to air and moisture, high tensile strength and high stability in its chemical and physical properties. In the prsently preferred embodiment, the plastic used in either polyethylene or polypropylene of a thickness of up to twenty-five mils.

Figure 3:
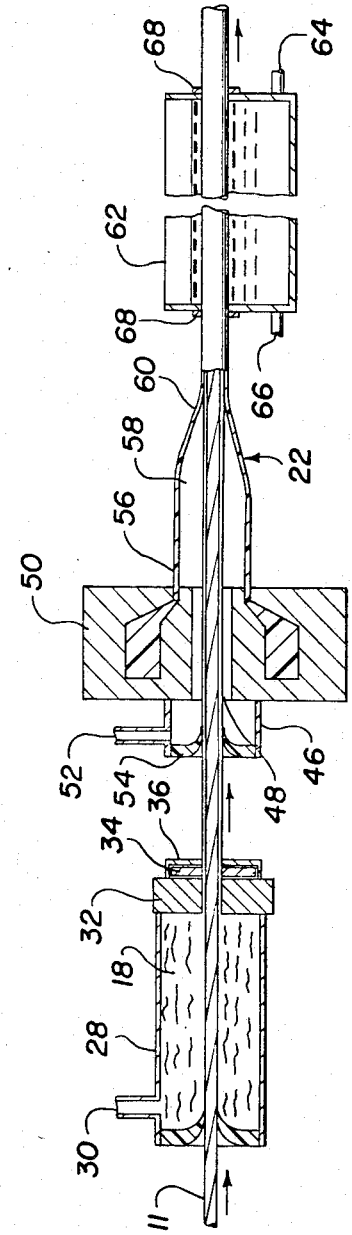
FIG. 3 is a simplified diagrammatic view of the inventive method for making a tendon.

With reference to FIG. 3, the present inventive method for making a tendon is disclosed. In this method a multi-wire strand 11 is passed into pressure chamber 28 into which a corrosion inhibitor 18 is fed while under pressure through inlet 30. A guide and corrosion inhibitor retaining bushing 32 centers the multi-wire strand 11 and prevents the escape of the corrosion inhibitor 18. The pressure in the pressure chamber 28 is adjusted so that the corrosion inhibitor 18 penetrates and fills all the pockets 20 and coats the exposed or outer surfaces 16 of the helically wrapped wires 14 with a thick coating of the corrosion inhibitor 18. Bushing 32 reduces and smooths the corrosion inhibitor 18 around the multi-wire strand 11 so that the corrosion inhibitor 18 forms a circular encasement about the multi-wire strand 11 which has a diameter greater than the diameter of the multi-wire strand 11. The multi-wire strand 11, encased in the corrosion inhibitor 18, is then passed through die 34. Die 34 is mounted for rotational movement in casing 36 which is attached to pressure chamber 28. It will be appreciated that as the multi-wire strand 11 is pulled (without rotation) through opening 40 (see FIG. 4) of die 34, then die 34 must rotate to allow opening 40 to follow the path of travel of the six helically wrapped wires 14. Die 34 removes excess amount of the thick coating of the corrosion inhibitor 18 from the multiwire strand 11 such that only a thin coating of the corrosion inhibitor 18 remains on the outside surfaces of the multi-wire strand 11.

Figure 4:
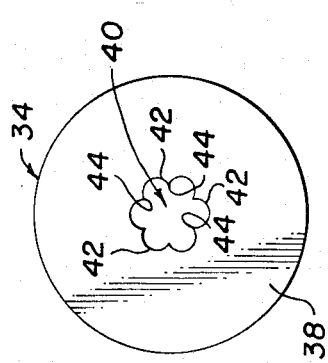
FIG. 4 is a simplified front elevational view of a die used in the inventive method.

With reference to FIG. 4, the die 34 is disclosed and comprises a solid disc portion 38 with a centrally located opening or aperture 40 therein. The shape of the periphery of the opening or aperture 40 in die 34 conforms to and traces an exactness of the cross-sectional shape of the periphery of the multi-wire strand 11 used in making the tendon 10. The generally semi-circular cutouts or valleys 42 conform to the outer periphery of the wrapped wires 14 with the peaks or extensions 44 fitting into the interstices 26. The opening or aperture 40 is only slightly larger than the corresponding measurement of the multi-wire strand 11.

At this point in the inventive method for making a tendon the multi-wire strand 11 has been coated with a corrosion inhibitor 18 and the excess amount of corrosion inhibitor 18 has been removed such that only a thin coating of the corrosion inhibitor 18 remains. A loosely fitting plastic jacket 22 is now to be formed around the thinly coated multi-wire strand 11. A differential pressure may be created across the seamless plastic jacket 22 by introducing a quantity of gas, at a pressure greater than atmospheric, into the space between the coated multi-wire strand 11 and the seamless plastic jacket 22. A differential pressure may also be created across the seamless plastic jacket 22 by reducing the external pressure around the seamless plastic jacket 22 (e.g. by vacuum means) relative to the pressure residing in the space between the coated multi-wire strand 11 and the seamless plastic jacket.

In the embodiment in which the differential pressure is created by the introduction of a pressurized gas, the coated multi-wire strand 11 leaves casing 36 and enters air chamber 46 and then is passed through the throat 48 of tubing die 50. Compressed air is introduced into air chamber 46 through inlet 52 under a predetermined pressure of two to four p.s.i. Seal 54 provides a loose seal around the coated multi-wire strand 11 as the multi-wire strand 11 passes into air chamber 46 so as not to remove the corrosion inhibitor 18 therefrom but to control the leakage of air from air chamber 46 and to maintain a proper air pressure in air chamber 46. Simultaneously with the introduction of compressed air into air chamber 46, molten thermoplastic polymer 56 is extruded as a seamless plastic jacket 22 around the coated multi-wire strand 11. The compressed air enters chamber or pocket 58 through the throat 48 of tubing die 50 around the periphery of the multi-wire strand 11 and maintains the thermoplastic polymer 56 a predetermined distance from and greater than the diameter of the multi-wire strand 11 during initial cooling of the thermoplastic polymer 56, resulting in a loosely fitting seamless plastic jacket 22. It is preferable to adjust the rate of travel of the multi-wire strand 11 and the rate of extrusion of the thermoplastic polymer 56 so that there is a necking-down 60 of the thermoplastic polymer 56 at a distance from the tubing die 50 that will permit the cooling of the thermoplastic polymer 56 to a temperature below the vaporization temperature of the corrosion inhibitor 18 prior to completion of the necking-down process.

After the necking-down process it is preferable that the seamless plastic jacket 22 be rapidly cooled and hardened so that the tendon 10 may be wound onto a spool or otherwise handled for storage and/or shipment. Any method of cooling and any medium for cooling may be used as long as it is compatible with the seamless plastic jacket 22. In the method of FIG. 3 the multi-wire strand 11 and the loosely fitting seamless plastic jacket 22 are passed into a water cooling tank 62. Cold water enters the water cooling tank 62 through inlet 64 and exits outlet 66. Appropriate seals 68 through inlet 64 and exits outlet 66. Appropriate seals 68 at the entrance and exit points for tendon 10 minimize the leakage of water from the water cooling tank 62 and assist in maintaining the proper level of water in the water cooling tank 62 so that the water covers the tendon 10 and effectively cools the seamless plastic jacket 22 so that the seamless plastic jacket 22 hardens properly. Air is maintained in the space between the multi-wire strand 11 and the seamless plastic jacket 22 during the cooling and hardening process.

In the embodiment in which the differential pressure is created by reducing the external pressure around the seamless plastic jacket 22, a vacuum source is operatively connected to an enclosed cooling tank 62 so the exterior surface of the seamless plastic jacket 22 is subjected to a predetermined value of vacuum which results in a differential pressure across the wall of the the seamless plastic jacket 22 of about two to about four p.s.i. It will be appreciated that a special vacuum chamber could be provided just prior to the enclosed cooling tank 62 to provide the function of creating a differential pressure across the seamless plastic jacket.

The multi-wire strand 11 may be of any form and size. However, the multi-wire strands which are more commonly used are those having one straight center wire and six wires helically wrapped in one direction to cover the center wire. For post-tensioning of concrete, strands of about 0.30 inch to about 0.75 inch in diameter are normally used. It is preferable that the strands be of high-tensile steel which has a breaking strength of at least 200,000 p.s.i.

Although the present invention has been described in conjunction with specific forms thereof, it is evident that many alternatives, modifications and variations will become apparent to those skilled in the art in the light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiment. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

I claim:

1. The method of making a tendon suitable for use in post-tensioning concrete and for use in other applications comprising the steps of:
    (a) coating a multiple-wire strand of helically wrapped wires with a thixotropic corrosion inhibitor;
    (b) removing excess portions of said corrosion inhibitor from the outer surface of said strand and the interstices between adjacent helically wrapped wires at the surface of said strand to leave a thin coat of inhibitor on the helically wrapped wires of said strand; and
    (c) forming around said coated strand a plastic jacket having an internal diameter greater than the external diameter of said coated strand such that an air space exists between said coated strand and an internal surface of said jacket.

2. The method of claim 1 further including the step of introducing a supply of gas at a predetermined pressure into the space between said coated strand and said plastic jacket during the formation of said jacket to maintain the internal diameter of the plastic jacket greater than the diameter of said strand until the jacket has substantially hardened.

3. The method of claim 1 further including the step of introducing a vacuum of predetermined value around the outside of said plastic jacket during the formation of said jacket to maintain the internal diameter of the plastic jacket greater than the diameter of said strand until the jacket has substantially hardened.

4. The method of claim 1 wherein said plastic jacket is seamless.

5. The method of claim 18 wherein said wires are high-tensile steel and the plastic is polyethylene.

6. The method of claim 1 wherein said wires are high-tensile steel and the plastic is polypropylene.

7. The method of claim 2 wherein the gas is air.

8. The method of claim 2 wherein the predetermined pressure is about two to about four p.s.i.

9. The method set forth in claim 1 including the step of creating a differential pressure across the wall of said plastic jacket during the formation thereof so that the pressure on the inside of the jacket is greater than the pressure on the outside thereof.

10. Apparatus for making a tendon suitable for use in post-tensioning concrete and for use in other applications comprising:
    (a) means for applying a coating of thixotropic corrosion inhibitor to a strand of helically wrapped wires;
    (b) means for removing excess corrosion inhibitor from the outer surface of said strand and the interstices between adjacent helically wrapped wires at the surface of said strand to leave a thin coat of inhibitor on said helically wrapped wires of said strand; and
    (c) means for extruding around said coated strand a plastic jacket having an internal diameter greater than the external diameter of said coated strand such that an air space exists between said coated strand and an internal surface of said jacket.

11. Apparatus for making a tendon suitable for use in post-tensioning concrete and for use in other applications comprising:
    (a) means for applying a coating of thixotropic corrosion inhibitor to a strand of helically wrapped wires;
    (b) means for removing excess corrosion inhibitor from the outer surface of said strand and the interstices between adjacent helically wrapped wires at the surface of said strand, said last named means comprising a disc with a central aperture therein positioned so that said strand must pass axially through said central aperture after said coating has been applied thereto, the shape of said central aperture substantially conforming to the cross-sectional shape of said strand; and
    (c) means for extruding around the coated strand a plastic jacket having an internal diameter greater than the external diameter of said coated strand.

12. Apparatus as defined in claim 11 wherein said disc is adapted to rotate about said strand as said strand is drawn through said central aperture.

* * * * *

UNITED STATES PATENT AND TRADEMARK OFFICE
CERTIFICATE OF CORRECTION

PATENT NO.  : 4,623,504
DATED       : November 18, 1986
INVENTOR(S) : Larry F. Smith It is certified that error appears in the above-identified patent and that said Letters Patent is hereby corrected as shown below:

In Column 1, line 30, change "bee" to ---been---
In Column 4, line 49, delete "Appropriate seals 68"
In Column 4, line 50, delete "through inlet 64 and exits outlet 66."
In Column 6, line 7, change "18" to ---1---

Signed and Sealed this

Eighth Day of September, 1987

Attest:

DONALD J. QUIGG

*Attesting Officer*  *Commissioner of Patents and Trademarks*